(12) United States Patent
Garnier et al.

(10) Patent No.: US 7,444,834 B2
(45) Date of Patent: Nov. 4, 2008

(54) METHOD AND INSTALLATION FOR THE PROVISION OF GAS UNDER PRESSURE

(75) Inventors: Emmanuel Garnier, Paris (FR); Frédéric Staine, Le Plessis Trevise (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 362 days.

(21) Appl. No.: 10/551,602

(22) PCT Filed: Mar. 12, 2004

(86) PCT No.: PCT/FR2004/050105
§ 371 (c)(1),
(2), (4) Date: Sep. 30, 2005

(87) PCT Pub. No.: WO2004/090445
PCT Pub. Date: Oct. 21, 2004

(65) Prior Publication Data
US 2007/0101763 A1 May 10, 2007

(30) Foreign Application Priority Data
Apr. 2, 2003 (FR) .................................. 03 04105

(51) Int. Cl.
*F25J 3/00* (2006.01)
(52) U.S. Cl. .............................. 62/654; 62/648; 62/653
(58) Field of Classification Search .................. 62/643, 62/653, 654, 648
See application file for complete search history.

(56) References Cited

U.S. PATENT DOCUMENTS 5,505,052 A * 4/1996 Ekins et al. .................... 62/643
5,896,755 A * 4/1999 Wong et al. .................... 62/643

(Continued)

FOREIGN PATENT DOCUMENTS

EP 0 452 177 10/1991

(Continued)

OTHER PUBLICATIONS

International Search Report for PCT/FR04/050105.

(Continued)

*Primary Examiner*—William C Doerrler
(74) *Attorney, Agent, or Firm*—Elwood Haynes

(57) ABSTRACT

The invention relates to a method for the provision of gas under pressure, by vaporisation of a cryogenic liquid from at least two cryogenic separation devices (A, B, C, D). Each device comprises a heat exchanger (1) and a system of columns (2, 3). In a first mode of operation, a cryogenic liquid is withdrawn from the columns in each cryogenic separation device, at least a part of which is pressurised (7, 8) to give a pressurised cryogenic liquid (9) and at least a part of the cryogenic liquid under pressure is vaporised in the heat exchanger (1) to give a part of gas under pressure (10). A cryogenic liquid is sent (6) from the cryogenic separation device to a common store (12) and at least one liquid (28A, 28B, 28C, 28D) coming from the store is vaporised in the exchange line (1) in at least one of the cryogenic separation devices.

10 Claims, 2 Drawing Sheets

U.S. PATENT DOCUMENTS

Figure 1:
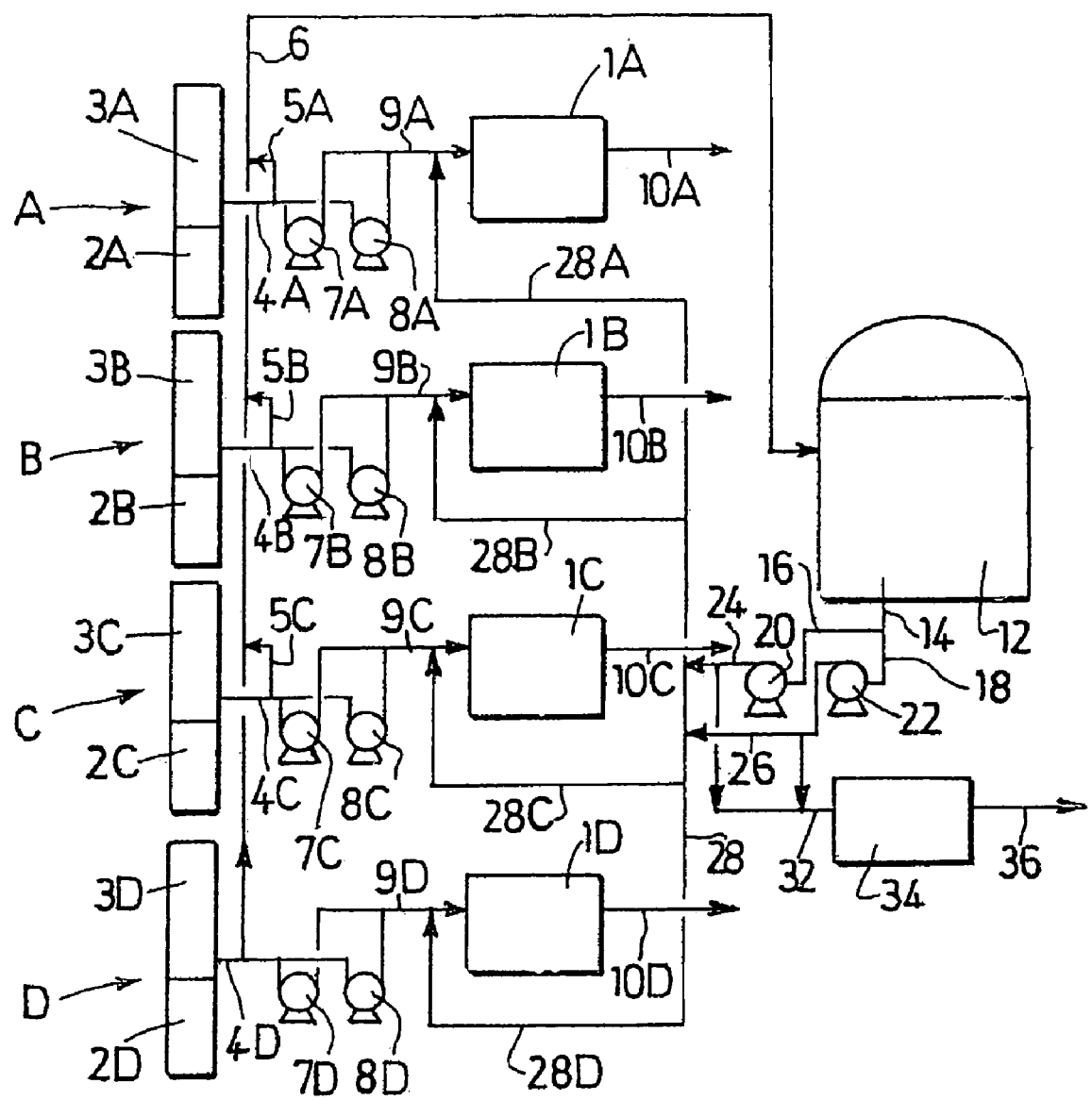

| | | | |
|---|---|---|---|
| 6,357,259 B1 * | 3/2002 | Higginbotham et al. | 62/656 |
| 6,581,411 B2 * | 6/2003 | Massimo et al. | 62/643 |
| 6,945,076 B1 * | 9/2005 | Garnier et al. | 62/643 |
| 2004/0261453 A1 * | 12/2004 | Guillard et al. | 62/643 |

FOREIGN PATENT DOCUMENTS

| | | |
|---|---|---|
| EP | 0 628 778 | 12/1994 |
| EP | 0 770 841 | 5/1997 |
| EP | 1 160 528 | 12/2001 |

OTHER PUBLICATIONS

W. J. Scharle et al.: "Oxygen Facilities for Synthetic Fuel Projects", Journal of Engineering for Industry, Nov. 1981, vol. 103, pp. 409-417.

* cited by examiner

METHOD AND INSTALLATION FOR THE PROVISION OF GAS UNDER PRESSURE

The present invention relates to methods and installations for supplying at least one pressurized gas, in particular those used to supply customers with gaseous products (nitrogen, oxygen, argon) from cryogenic separation units (such as air separation units, denoted ASU) which are supported by cryogenic storage facilities. The invention also applies to installations for supplying other cryogenic liquids such as hydrogen, helium and carbon monoxide.

The invention applies in particular to methods for supplying a gas from a plurality of industrial installations.

An emergency vaporization unit is illustrated in EP-A-0452177, in which liquid nitrogen from a storage facility is vaporized in a heat exchanger by heat exchange with the ambient air.

EP-A-0628778 describes a cryogenic liquid storage facility from which the liquid is pumped and then vaporized in a vaporizer before being sent to the customer.

The articles: "Large Oxygen Plant Economics and Reliability" by W. J. Scharle, Bulletin Y-143, National Fertilizer Division Centre, Tennessee Valley Authority, Muscle Shoals, Ala. and "Oxygen Facilities for Synthetic Fuel Projects" W. J. Scharle and K. Wilson, Journal of Engineering for Industry, November 1981, Vol. 103, pp. 409-417 describe systems for emergency oxygen production composed essentially of:
  a storage facility containing a quantity of product in liquid form,
  a plurality of pumps (two here for reasons of dependability) which withdraw the liquid present in the storage facility to compress it to the pressure normally delivered to the customers (pressure in the line),
  a heat exchanger for the purpose of vaporizing the liquid under pressure.

At the exit of these auxiliary units, the gas is generally close to ambient temperature and is sent to the customer. Depending on the energy sources available on the site and their costs, the heat exchanger can use, as a heat source to vaporize the liquid under pressure, for example, air, steam, hot water and combustion flue gases.

One of the main features of these emergency installations is their start-up time. This is particularly critical because it conditions the quality and continuity of the supply of gas to the customers. An excessively long start-up time after starting the production unit can generate a very high pressure drop in the line and generate malfunctions in the customers' processes and the shutdown of their installations.

In the case of the oxygen productions systems described in the above articles, a gaseous oxygen buffer tank is provided to supply the pressurized product during the time necessary to start up the pump (about 15-20 minutes according to the articles by W. J. Scharle mentioned above).

Conventionally, if the vaporization pump is maintained permanently at cryogenic temperature, the time necessary for the emergency system to reach its full capacity in stable condition is about five minutes, which is broken down into one to two minutes for start-up of the pump and two to three minutes for a ramp-up of the vaporization heat exchanger. A sound choice of the architecture and arrangements of the various components (short piping between the pump and the storage facility and between the pump and the heat exchanger) enables this time to be shortened to about three minutes. In certain cases, this time interval of three minutes is still too long for the pressure fluctuation constraints permitted in the line: in this case, as described above, one solution is to install gas buffer tanks downstream of the heat exchanger (at 200 bar for example), dimensioned to supply production for one to three minutes, the time needed for the pump-and-vaporizer system to reach its normal operating state. The drawback of this solution is its high price (large installed volume, high pressure, pump to fill the buffer tanks). An object of the invention is to avoid having costly immediate-resumption systems of this type. Particular problems arise when a pressurized gas has to be supplied from a plurality of cryogenic separation units. For large projects, for example, four or five air separation units are required, each using, for example, two liquid oxygen pumps or a single liquid oxygen pump, which can break down. To obtain acceptable availability, it may be necessary to provide an installed reserve pump on each unit, implying a large number of pumps. Another object of the invention is to avoid an excessive number of pumps, while proposing a comparable availability to that obtained by having redundant pumps for each unit. Provision can be made for all the liquid from each unit to transit to a common storage facility before being pumped and redistributed to the units to be vaporized in the heat exchange lines of each unit. In this case, however, in case of loss of purity of a unit, it cannot be isolated from the other units, and its production cannot be separated from that of the other units. If the production of cryogenic liquid of a unit is polluted, it is important to prevent polluting the storage facility (which can also serve to supply LOX on the bulk market and the purity of which may not be fixed by the gas user alone) and the overall production. In case of loss of purity on a unit, another object of the invention is to enable it to be isolated from the storage facility and hence avoid polluting the facility, and, depending on the customer's requirements, to continue or discontinue the production from this unit, the production of the other units being unaffected.

According to one aspect of the invention, it proposes a method for supplying a pressurized gas by vaporization of a cryogenic liquid from at least two cryogenic separation units, each unit comprising a heat exchanger and a system of columns, in which, in each unit:

a) a gas mixture compressed and purified in the heat exchanger is cooled to produce a compressed, purified and cooled gas mixture;

b) the compressed, purified and cooled gas mixture is separated in the system of columns;

c) a cryogenic liquid is withdrawn from the system of columns, and, in a first operating mode, a first portion of the pressurized cryogenic liquid is vaporized in the heat exchanger to supply a portion of the pressurized gas, and d) the pressurized gas is supplied from each unit, or the pressurized gas from the cryogenic separation units is mixed, and in which, e) according to the first operating mode, a second portion of the cryogenic liquids from each cryogenic separation unit is sent to a storage facility, and f) according to the first operating mode, cryogenic liquid from the storage facility is sent to each heat exchanger to be vaporized therein.

Preferably, according to the first operating mode, an equal amount of liquid enters and leaves the storage facility, so that the liquid level in the storage facility is substantially constant.

According to other particular aspects of the invention:
  the second portion of the cryogenic liquid is not pressurized upstream of the storage facility and/or the first portion of the cryogenic liquid is pressurized upstream of the heat exchanger for each cryogenic separation unit;
  in a first operating mode, cryogenic liquid from the storage facility is sent to the heat exchanger of at least one cryogenic separation unit, preferably to the heat exchanger of at least two cryogenic separation units, and the cryogenic liquid is vaporized in this heat exchanger (these heat exchangers) to supply a portion of the pressurized gas;

the cryogenic liquid is pressurized downstream of the common storage facility and upstream of the heat exchanger;

in case of shutdown of a cryogenic separation unit, according to a second operating mode, the common storage facility supplies a common vaporizer, preferably after a pressurization step, in which the cryogenic liquid from the common storage facility is vaporized by heat exchange with a heating liquid to supply all or a portion of the pressurized gas;

the cryogenic liquid vaporized in the common vaporizer only comes from the common storage facility;

in each cryogenic separation unit, the entire gas mixture intended for separation is cooled in the heat exchanger by heat exchange with at least one cryogenic liquid and at least one gas from the system of columns;

the first portion of cryogenic liquid is pressurized by means of at least one pump and according to a third operating mode, in case of shutdown of at least one of the pumps of a cryogenic separation unit, in order to compensate for the loss of compressed liquid due to the shutdown of this pump, the second portion of the cryogenic liquid sent to the storage facility is increased compared with the flow when the pump is running, and in the case in which one pump of the unit remains in working order, the flow rate of cryogenic liquid from the system of columns and sent to the heat exchanger of this cryogenic separation unit is increased in comparison with the flow rate when the pump is running:

in case of shutdown of at least one pump of a cryogenic separation unit, the first portion of the cryogenic liquid is increased in comparison with the flow when the pump is running for at least one other air separation unit of which the pump or pumps is/are running and the second portion of the cryogenic liquid sent to the storage facility is reduced in comparison with the flow when the pump is running for at least one other air separation unit of which the pump(s) is/are running;

in case of shutdown of a cryogenic separation unit, the second portion of the cryogenic liquid sent from at least one cryogenic separation unit to the common storage facility is reduced in comparison with the flow when the unit is running, preferably to zero, the first portion of the cryogenic liquid sent to the heat exchanger is increased in comparison with the flow when the unit is running for at least one cryogenic separation unit remaining in operation;

only in case of shutdown of at least one cryogenic separation unit, cryogenic liquid is sent from the storage facility to an emergency vaporizer.

If the same pressurizing means serve to pressurize the liquid from the storage facility and intended to be vaporized in the heat exchanger of at least one cryogenic separation unit and to pressurize the liquid from the storage facility and intended to be vaporized in the vaporizer, these pressurizing means can operate permanently because they serve both when the unit is in working order (first operating mode with vaporization of liquid sent directly and indirectly to the heat exchanger) and in shutdown (second operating mode with vaporization of liquid in a vaporizer replacing the gas produced by at least one unit).

According to another object of the invention, an installation is proposed for supplying a pressurized gas by vaporization of a cryogenic liquid from at least two cryogenic separation units, each unit comprising a heat exchanger and a system of columns comprising, in each unit:

a) means for sending a compressed and purified gas mixture to the heat exchanger to produce a compressed, purified and cooled gas mixture;

b) means for sending the compressed, purified and cooled gas mixture to the system of columns;

c) means for withdrawing a cryogenic liquid from the system of columns, and means for sending at least a first portion of the pressurized cryogenic liquid to the heat exchanger to supply a portion of the pressurized gas;

d) if applicable, means for mixing the pressurized gas from at least two cryogenic separation units to supply the pressurized gas;

and further comprising a common storage facility and means for sending a second portion of the cryogenic liquid from the cryogenic separation units to the common storage facility, and means for sending cryogenic liquid from the storage facility to the heat exchanger of each cryogenic separation unit.

Preferably, the installation does not comprise any pressurizing means downstream of the system of columns and upstream of the common storage facility.

According to other particular aspects of the invention, the installation can comprise:

a pressurizing means downstream of the system of columns and upstream of the heat exchanger, preferably having an outlet connected both to the heat exchanger and to the common storage facility and/or an inlet connected to the system of columns and to the storage facility;

means for sending cryogenic liquid from the common storage facility to the heat exchanger of at least one cryogenic separation unit;

means for pressurizing the cryogenic liquid downstream of the common storage facility and upstream of the heat exchanger;

a common vaporizer, means for supplying the common vaporizer from the common storage facility, preferably pressurizing means downstream of the common storage facility and upstream of the common vaporizer and means for permitting heat exchange with a heating fluid and the cryogenic liquid in the vaporizer;

the same pressurizing means are connected downstream of the common storage facility and upstream of the common vaporizer and to at least one heat exchanger of a cryogenic separation unit (typically the heat exchanger of each cryogenic separation unit).

Preferably, the cryogenic liquid vaporized in the common vaporizer is only obtained from the common storage facility.

For the or each cryogenic separation unit, a cryogenic liquid line can connect the system of columns with the heat exchanger without passing through the common storage facility, and a cryogenic liquid line can connect the system of columns and the heat exchanger via the common storage facility.

The installation can comprise means for regulating the flow rates of liquid sent from at least one cryogenic separation unit to the common storage facility and/or means for regulating the flow rates of liquid sent from the common storage facility to the heat exchanger of said cryogenic separation units.

The vaporizer is suitable for permitting the heat exchange between the cryogenic liquid and a heating liquid which is not intended for cryogenic separation, such as steam or atmospheric air.

According to the first operating mode for a single unit, the separation unit produces liquid which vaporizes in a heat exchanger, a portion of the liquid being sent directly to the heat exchanger and the remainder being sent to the heat exchanger via a storage facility.

In the case in which the unit does not operate, according to a second operating mode for the single unit, there is no more liquid sent to the heat exchanger and the liquid from the storage facility supplies a vaporizer where it is vaporized.

Preferably according to the first operating mode, the liquid is pressurized by at least one pump for the liquid sent directly to the heat exchanger and by at least one other pump for the liquid from the storage facility. The same pump or at least another pump also serves to pressurize the liquid sent to the vaporizer in case of the second operating mode, and thus the at least one other pump is in permanent operation according to the first and second operating modes.

According to a third operating mode for the single unit, if one of the pumps which pressurizes the liquid sent directly to the heat exchanger does not operate, a portion of the liquid continues to be sent directly to the heat exchanger by pressurizing it with the pump or pumps remaining in operation and the remainder is sent to the heat exchanger via a storage facility.

The common storage facility can be situated inside a cold box of one of the separation units.

The invention is described in greater detail with reference to the figures.

Figure 2:
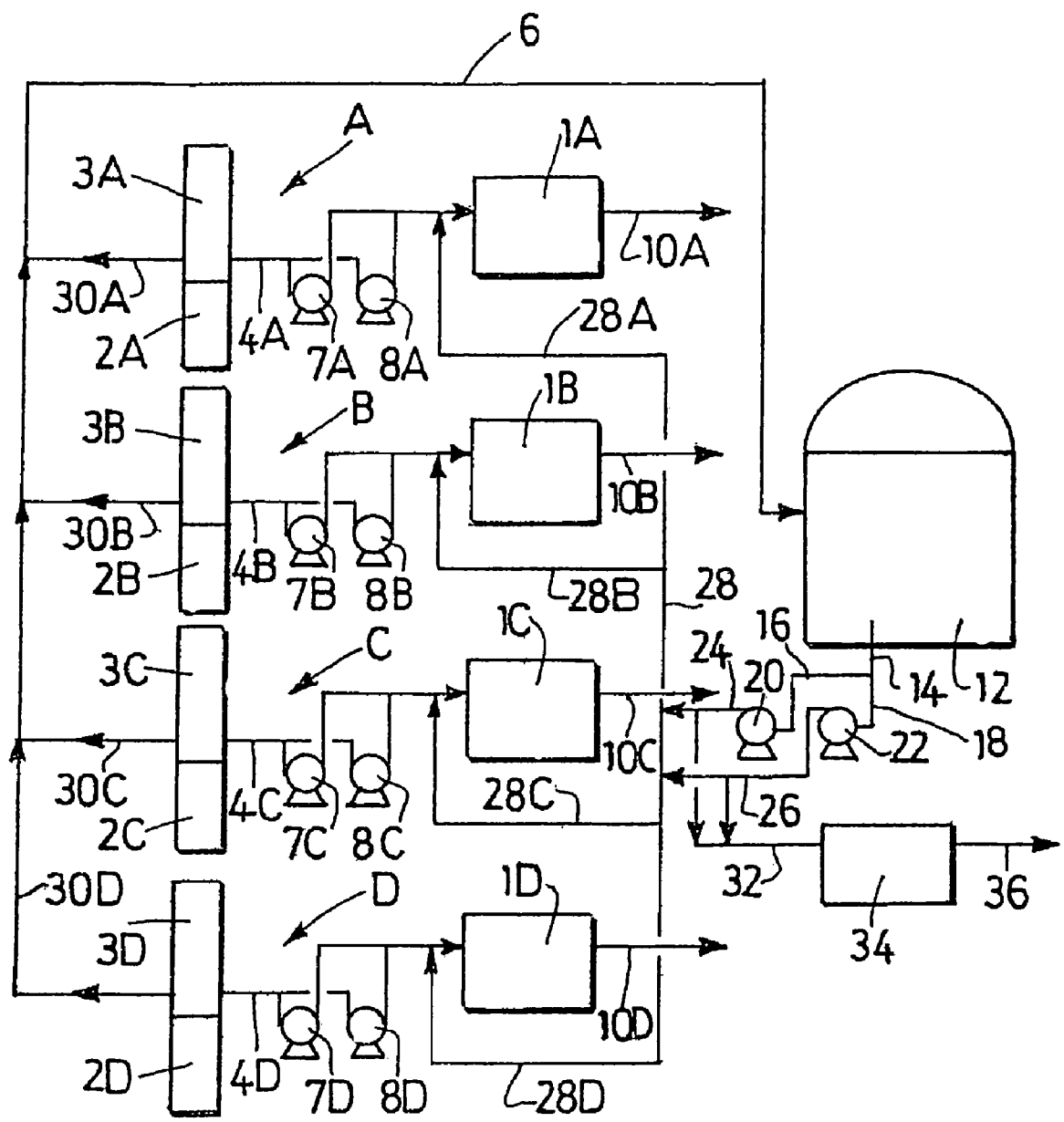

FIGS. 1 and 2 are schematic drawings of an embodiment of an installation according to the invention.

In the embodiment in FIG. 1, four air separation units A, B, C, D supply pressurized oxygen gas to at least one common customer. The four units are substantially identical and each comprise a main heat exchanger 1A, 1B, 1C, 1D and a double column comprising a medium-pressure column 2A, 2B, 2C, 2D and a low-pressure column 3A, 3B, 3C, 3D. The liquid oxygen flow rates 4A, 4B, 4C, 4D withdrawn from each ASU are substantially identical.

Since the operation and the disposition of each unit is substantially the same, a single unit A is described here in detail.

Compressed and purified air is cooled in the heat exchanger 1A by heat exchange with at least one gas from the low-pressure column 3A and liquid oxygen 4A. The cooled air is sent to the medium-pressure column 2A in gaseous form. A portion of the air is liquefied by heat exchange with the liquid oxygen which vaporizes and is then sent to the medium-pressure column and/or to the low-pressure column. The unit can be kept cold by any known means such as a Claude turbine and/or a blowing turbine and/or a nitrogen turbine and/or by liquid assist. The usual reflux rise lines between the medium- and low-pressure columns do not appear in the figures, nor do the draw-offs of nitrogen-enriched fluids.

In the embodiment described, in normal operating mode, liquid oxygen 4A is withdrawn in a tank from the low pressure column 3A and divided into two. A first portion of the liquid oxygen 4A, for example 80% of the withdrawn flow rate, is compressed by, for example, two pumps in parallel 7A, 8A which are advantageously each dimensioned at 50% of the capacity of a train of which each receives half of the first portion of liquid oxygen and which each run for example at 80% of their capacity, that is, in our example, at 40% of the liquid oxygen capacity of the separation unit. Obviously the two pumps 7A, 8A can be replaced by a single pump of which the capacity would accordingly, for example, be 100% of one train and which pressurizes the entire first portion of the liquid oxygen. The pumped liquid oxygen flow is sent via the line 9A to the heat exchanger 1A where it vaporizes to form pressurized gas 10A which can be sent to the customer. This gas typically joins the outlet gases 10B, 10C, 10D from the other units B, C, D.

A second portion of the liquid oxygen, constituting the remainder of the oxygen withdrawn, or 20% in our example, passes through a line 5A to join a common line 6 leading to a common storage facility 12 in which the oxygen from the separation units is stored, the common line 6 being supplied similarly by the other ASUs. The common line can be replaced by a dedicated line for each train.

The storage facility is thus supplied permanently by all (or at least a portion, the given distribution being only one example) of the ASUs in normal mode, and its pumps 20 and 22 are therefore constantly in "process" operation, close to their normal regime. They redistribute the liquid to each ASU in the same proportions as the liquid that came from each ASU (in our example 20% of the liquid oxygen withdrawn per ASU). In this way, the liquid that vaporizes in the heat exchanger 1 constitutes 100% of the oxygen flow withdrawn, of which 80% comes directly from the pumps 7, 8 and of which 20% has passed through the storage facility 12 and the pumps 20, 22. These pumps 20, 22 are thus in regime for immediate resumption in case of shutdown of one ASU, in which case they immediately pass into "emergency vaporization" function (whereas with the operation described above, they are in the first operating mode).

When a pump of an ASU having two oxygen pumps in parallel stops running, for example 7A, 8A then ramps up to 50% of the oxygen flow withdrawn by this ASU, the liquid oxygen transfer 5A going to the common storage facility 12 and coming from this ASU rises to 50% of the oxygen flow withdrawn from the ASU A, and the other pumps of the other ASUs B, C, D rise for example (other operating points can be considered) each to 45% of the oxygen flow withdrawn from each ASU B, C, D (to pump 90% of the oxygen withdrawn), and the liquid from the other ASUs which passes through the storage facility is decreased to 10% of the oxygen flow withdrawn for each ASU. The pumps 20 and 22 are still at the same 80% regime, and the liquid pumped by these pumps 20 and 22 is still redistributed in the same way as it was withdrawn from each ASU, or in our example, 50% of the oxygen flow withdrawn from the ASU A to the ASU A of 7A, and 10% of the oxygen flow withdrawn to each of the others.

If all the pumps of the same unit stop running, 100% of the liquid is then transferred from this unit to the storage facility, and the other units operate in "isolated mode" from the storage facility. In case of the shutdown of one of the pumps of another unit, then 50% of the liquid from each unit having one only pump in operation is transferred and the other units operate in isolated mode. The pumps for the liquid from the storage facility then operate at 100% of their capacity and send 50% of liquid to each unit having only one pump in operation.

The line 24 downstream of the pumps 20 and 22 of cryogenic liquid from the storage facility 12 is connected to a vaporizer 34 via a line 32. This vaporizer serves to vaporize the cryogenic liquid by heat exchange with a heating fluid, for example air, steam, hot water, or combustion flue gases.

When an ASU is shut down the pumps 7 and 8 of the other ASUs then rise to 50%, thereby making each ASU "isolated" from the storage facility, and there is no longer any need to make the liquid pass through the storage facility 12 via the line 6. The pumps 20 and 22 of the storage facility 12 then pump liquid 14 taken from the reserve of the storage facility 12. The pumped liquid is vaporized in the emergency vaporization 34. They accordingly consume the liquid from the storage facility, whereas in the operating modes previously described, they only pump the same quantity of liquid as the quantity from the ASUs, so that the liquid level in the storage facility substantially does not drop. The fact that the pumps 20, 22 were already in regime (and close to their full regime) serves to guarantee a virtually immediate resumption by the emergency vaporizer, without additional investment of the high-pressure buffer storage tank type, etc.

Each air separation unit preferably has its cold box, the storage facility being situated inside one of these cold boxes or having its own insulation.

For the case, not shown, in which an air separation unit has a single cryogenic liquid pump, when this pump stops running, all the liquid is sent to the common storage facility, pumped by the pumps 20, 22 or a single pump, and sent to the cold end of the heat exchanger of the separation unit of which the pump is shut down to supply the production of this ASU.

The installation in FIG. 2 comprises all the elements of FIG. 1 but differs from it as follows:

The liquid sent to the common storage facility 12 via the common line 6 comes not from the lines 4A-4D conveying the liquid to the dedicated pumps 7A, 8A, but from dedicated lines 30A-30D connecting the tank from the low-pressure columns 3A-3D with the common line 6. Obviously the cryogenic liquids of the lines 4A and 30A substantially have the same composition. Dedicated lines connecting each ASU with the storage facility can replace the common line 6.

The method substantially operates in the same way as that shown in FIG. 1.

For the two embodiments in FIGS. 1 and 2, it will be understood that the pumps 7, 8 will not be necessary if the low-pressure columns 3 operate at a sufficiently high pressure.

The pressurized liquid, vaporized and mixed to form the pressurized gas, can be nitrogen or argon.

The system of columns can comprise a conventional double column, a double column with double vaporizer in the low-pressure column or a triple column. An argon column can furthermore be present on at least one of the units.

The oxygen gas can vaporize in the main heat exchange line of the separation unit or can vaporize in a dedicated heat exchanger by heat exchange with air.

Other modifications and variants will appear to a person skilled in the art within the framework of the claims below.

The invention claimed is:

1. A method for supplying a pressurized gas by vaporization of a cryogenic liquid from at least two cryogenic separation units, at least one of said units comprising a heat exchanger and a system of columns, in which, in each separation unit,
    a) a compressed and purified gas mixture is cooled in the heat exchanger to produce a compressed, purified and cooled gas mixture,
    b) the compressed, purified and cooled gas mixture is separated in the system of columns,
    c) a cryogenic liquid is withdrawn from the system of columns, pressurized, and, in a first operating mode, a first portion of the pressurized cryogenic liquid is vaporized in the heat exchanger to supply a portion of the pressurized gas, and
    d) the pressurized gas is supplied from each unit,
and in which, according to the first operating mode:
    e) a second portion of the cryogenic liquids from each cryogenic separation unit is sent to a common storage facility, and
    f) cryogenic liquid from the storage facility is sent to each heat exchanger to be vaporized therein, wherein, in case of shutdown of a cryogenic separation unit, of a second operating mode, the common storage facility supplies a common vaporizer, preferably after a pressurization step, in which the cryogenic liquid from the common storage facility is vaporized by heat exchange with a heating liquid to supply all or a portion of the pressurized gas.

2. The method of claim 1, in which the cryogenic liquid vaporized in the common vaporizer only comes from the common storage facility.

3. A method for supplying a pressurized gas by vaporization of a cryogenic liquid from at least two cryogenic separation units, at least one of said units comprising a heat exchanger and a system of columns, in which, in each separation unit,
    a) a compressed and purified gas mixture is cooled in the heat exchanger to produce a compressed, purified and cooled gas mixture,
    b) the compressed, purified and cooled gas mixture is separated in the system of columns,
    c) a cryogenic liquid is withdrawn from the system of columns, pressurized, and, in a first operating mode, a first portion of the pressurized cryogenic liquid is vaporized in the heat exchanger to supply a portion of the pressurized gas, and
    d) the pressurized gas is supplied from each unit,
and in which, according to the first operating mode:
    e) a second portion of the cryogenic liquids from each cryogenic separation unit is sent to a common storage facility, and
    f) cryogenic liquid from the storage facility is sent to each heat exchanger to be vaporized therein, in which the first portion of cryogenic liquid is pressurized by means of at least one pump and, of a third operating mode, in case of shutdown of at least one of the pumps of a cryogenic separation unit, in order to compensate for the loss of compressed liquid due to the shutdown of this pump, the second portion of the cryogenic liquid sent to the storage facility is increased compared with the flow when the pump is running, and in the case in which one pump of the unit remains in working order, the flow rate of cryogenic liquid from the system of columns and sent to the heat exchanger of this cryogenic separation unit is increased in comparison with the flow rate when the pump is running.

4. The method of claim 3, in which, in case of shutdown of at least one pump of a cryogenic separation unit, the first portion of the cryogenic liquid is increased in comparison with the flow when the pump is running for at least one other air separation unit of which the pump or pumps is/are running and the second portion of the cryogenic liquid sent to the storage facility is reduced in comparison with the flow when the pump is running for at least one other air separation unit of which the pump(s) is/are running.

5. A method for supplying a pressurized gas by vaporization of a cryogenic liquid from at least two cryogenic separation units, at least one of said units comprising a heat exchanger and a system of columns, in which, in each separation unit,
    a) a compressed and purified gas mixture is cooled in the heat exchanger to produce a compressed, purified and cooled gas mixture,
    b) the compressed, purified and cooled gas mixture is separated in the system of columns,
    c) a cryogenic liquid is withdrawn from the system of columns, pressurized, and, in a first operating mode, a first portion of the pressurized cryogenic liquid is vaporized in the heat exchanger to supply a portion of the pressurized gas, and d) the pressurized gas is supplied from each unit, and in which, according to the first operating mode:

e) a second portion of the cryogenic liquids from each cryogenic separation unit is sent to a common storage facility, and f) cryogenic liquid from the storage facility is sent to each heat exchanger to be vaporized therein, in which, in case of shutdown of a cryogenic separation unit, the second portion of the cryogenic liquid sent from at least one cryogenic separation unit to the storage facility is reduced in comparison with the flow rate when the unit is running, preferably to zero, the first portion of the cryogenic liquid sent to the heat exchanger is increased in comparison with the flow when the unit is running for at least one cryogenic separation unit remaining in operation.

6. A method for supplying a pressurized gas by vaporization of a cryogenic liquid from at least two cryogenic separation units, at least one of said units comprising a heat exchanger and a system of columns, in which, in each separation unit, a) a compressed and purified gas mixture is cooled in the heat exchanger to produce a compressed, purified and cooled gas mixture, b) the compressed, purified and cooled gas mixture is separated in the system of columns, c) a cryogenic liquid is withdrawn from the system of columns, pressurized, and, in a first operating mode, a first portion of the pressurized cryogenic liquid is vaporized in the heat exchanger to supply a portion of the pressurized gas, and d) the pressurized gas is supplied from each unit, and in which, according to the first operating mode:

e) a second portion of the cryogenic liquids from each cryogenic separation unit is sent to a common storage facility, and f) cryogenic liquid from the storage facility is sent to each heat exchanger to be vaporized therein, in which, only in case of shutdown of at least one cryogenic separation unit, cryogenic liquid is sent from the storage facility to an emergency vaporizer.

7. The installation of claim 5, comprising a common vaporizer, means for supplying the common vaporizer from the common storage facility, preferably pressurizing means downstream of the common storage facility and upstream of the common vaporizer and means for permitting heat exchange with a heating fluid and the cryogenic liquid in the vaporizer.

8. Installation for supplying a pressurized gas by vaporization of a cryogenic liquid from at least one cryogenic separation unit, each unit comprising a heat exchanger and a system of columns comprising, in each cryogenic separation unit:

a) means for sending a compressed and purified gas mixture to the heat exchanger to produce a compressed, purified and cooled gas mixture;

b) means for sending the compressed, purified and cooled gas mixture to the system of columns;

c) means for withdrawing a cryogenic liquid from the system of columns, means for pressurizing the cryogenic liquid, and means for sending at least a first portion of the pressurized cryogenic liquid to the heat exchanger to supply a portion of the pressurized gas;

the installation further comprising a common storage facility and means for sending a second portion of the cryogenic liquid from the cryogenic separation units to the common storage facility, a common vaporizer and means for sending a portion of the cryogenic liquid from the cryogenic separation units to the common vaporizer, and means for sending cryogenic liquid from the storage facility to the heat exchanger of each cryogenic separation unit, comprising means for sending cryogenic liquid from the common storage facility to the heat exchanger of at least one cryogenic separation unit, comprising means for pressurizing the cryogenic liquid downstream of the common storage facility and upstream of the heat exchanger, in which the same pressurizing means are connected downstream of the common storage facility and upstream of the common vaporizer and to at least one heat exchanger of a cryogenic separation unit.

9. The installation of claim 7, in which the cryogenic liquid vaporized in the common vaporizer is only obtained from the common storage facility.

10. The installation of claim 8 further comprising a means for mixing the pressurized gas from at least two cryogenic separation units to supply the pressurized gas.

* * * * *